(12) United States Patent
Chevrier et al.

(10) Patent No.: US 8,792,104 B2
(45) Date of Patent: Jul. 29, 2014

(54) USE OF AN OPTICAL DEVICE FOR INTERFEROMETRIC ANALYSIS OF THE SURFACE CONDITION OF AN OBJECT

(75) Inventors: Joël Chevrier, Saint Egreve (FR); Serge Huant, Grenoble Cedex (FR); Wilfrid Schwartz, Grenoble Cedex (FR); Alessandro Siria, Grenoble Cedex (FR)

(73) Assignees: Universite Joseph Fourier, Grenoble Cedex (FR); Centre National de la Recherche Scientifique, Paris (FR); Commissariat a l'Energie Atomique et aux Energies Alternatives, Paris (FR)

( * ) Notice: Subject to any disclaimer, the term of this patent is extended or adjusted under 35 U.S.C. 154(b) by 501 days.

(21) Appl. No.: 13/142,815

(22) PCT Filed: Dec. 29, 2009

(86) PCT No.: PCT/FR2009/052717
§ 371 (c)(1),
(2), (4) Date: Feb. 2, 2012

(87) PCT Pub. No.: WO2010/076540
PCT Pub. Date: Jul. 8, 2010

(65) Prior Publication Data
US 2012/0127474 A1    May 24, 2012

(30) Foreign Application Priority Data
Dec. 29, 2008    (FR) ...................................... 08 59091

(51) Int. Cl.
*G01B 9/02*    (2006.01)
(52) U.S. Cl.
USPC ............ 356/483; 356/505; 356/511; 356/506

(58) Field of Classification Search
USPC .......................... 356/482, 505, 506, 511, 519
See application file for complete search history.

(56) References Cited

U.S. PATENT DOCUMENTS

| 5,812,723 A | 9/1998 | Ohtsu et al. |
| 2003/0046024 A1 | 3/2003 | Duncan |

FOREIGN PATENT DOCUMENTS

EP    0487233    5/1992

OTHER PUBLICATIONS

International Preliminary Report on Patentability and Written Opinion issued Aug. 11, 2011 in PCT/FR2009/052717.
O. Bergossi, M. Spajer: "Scanning local probe interferometer and reflectometer: application to very low relief objects" Proc. Spie Interferometric Fiber Sensing, vol. 2341, 1994, pp. 239-248, XP002538769 D0I.
International Search Report issued in PCT/FR2009/052717 on Apr. 13, 2010.

*Primary Examiner* — Hwa Lee
(74) *Attorney, Agent, or Firm* — Vedder Price PC

(57) ABSTRACT

The instant disclosure describes an optical device for the interferometric analysis of the surface condition of an object, including: a light source; an optical fiber capable of receiving the incident light wave and transmitting said wave to the object; a detector capable of detecting a combination between a light wave reflected by the optical fiber and a light wave returned by the object; and in which the optical fiber has a free end in the shape of a cone, with a vertex angle of between 15 and 25 degrees, the tip of the cone having dimensions of less than 50×50 nm, and the tip of the cone being placed, while in use, at a distance of between 5 and 50 μm from the surface of the object.

3 Claims, 3 Drawing Sheets

USE OF AN OPTICAL DEVICE FOR INTERFEROMETRIC ANALYSIS OF THE SURFACE CONDITION OF AN OBJECT

FIELD OF THE INVENTION

The present invention relates to an optical fiber device for the interferometric analysis of the surface condition of an object capable of detecting relief variations with an axial accuracy on the order of one nanometer.

Such measurements are useful, in particular, for the study of micro-electronic, -mechanical, or -electro-mechanical components and of biologic mediums.

To set an order of magnitude, the present description will be carried out in the specific case where the optical wavelength of analysis is in the visible range, for example, in Red at a wavelength on the order of 600 nm. It should however be noted that the present invention also applies to the case where the wavelength of analysis is different, for example, at any desired value in the visible or infrared range. It will then be within the abilities of those skilled in the art to select an appropriate optical fiber and to adapt the dimensions according to the selected wavelength.

DISCUSSION OF PRIOR ART

FIG. 1 very schematically illustrates the operation of an optical device of interferometric analysis of the surface condition of an object. An optical source 1 sends a light beam, for example, a laser beam, towards surface 2 of an object to be analyzed via an optical fiber 3 comprising a core 4 and an optical cladding 5. The light beam forms a light spot of diameter d1 on the object. The light beam is sent back into the fiber, on the one hand, by end surface 7 of the fiber, and on the other hand by object 2, towards a beam splitter 8 and a detector 9. Thus, at the detector level, an interference between the light reflected by the end of the fiber and the light reflected by the object can be observed.

If the fiber is moved with respect to the object and the object is not perfectly planar and orthogonal to the axis of the beam coming out of the fiber, a variation of the interference pattern can be observed, which variation enables to determine the topography of the object.

Such a device has a very good axial or vertical resolution but a very poor lateral resolution. Indeed, with the divergence of the optical fiber, diameter dl of the light spot is, at best, when the end of the fiber is very close to the object, equal to the diameter of the fiber core, that is, a value on the order of from 3 to 5 μm for a fiber capable of operating with red light of a 600-nm wavelength. Further, to have a high-contrast interference system, the beams reflected by the end of the fiber and by the object must be as intense as possible and have intensities substantially of the same order of magnitude. This leads to placing the end of the fiber extremely close to the object, that is, at a distance shorter than 10 μm.

Further, a conventional optical fiber for red light comprises an optical cladding having an external diameter on the order of 100 μm. A practical problem then arises, which is that, when the fiber is moved with respect to the object very close to this object, there is a strong risk of collision between the fiber edges and the object, whereby the fiber and/or the object may be damaged.

Optical systems of interferometric analysis of the surface condition of an object wherein the light coming out of the fiber is focused onto the object have thus been provided.

FIG. 2 shows a fiber end corresponding to such a structure. End 11 of the core of an optical fiber 12 is lens-shaped, or provided with a lens, so that light beam 14 coming out of the fiber is focused in a small light spot having a diameter d2. As well known in optics, diameter d2 is optimally substantially equal to the half-wavelength of the incident beam, that is, it may have a diameter on the order of 300 nm if the incident light beam has a wavelength on the order of 600 nm.

The lateral resolution is thus greatly improved. However, a disadvantage of such a system is that distance h between the end of the optical fiber and the object must be constantly kept substantially equal to the focus length of the end lens of the fiber. Complex analysis systems which must comprise feedback systems to keep this distance constant thus have to be used.

Further, fibers with a conical end have been developed for various applications.

FIG. 3 shows an example of a device with a fiber having a conical end such as described in Olivier Bergosi and Michel Spajer's paper, "A Scanning Local Probe Interferometer and Reflectometer: Application to very low relief objects", published in 1994 in SPIE, Interferometric Fiber Sensing, volume 2,341, pages 239 to 248.

The described device comprises an optical fiber 20 having a pointed conical end 21. This device is described for interferometric measurements of the surface condition of a material in near field or quasi-near field, that is, when the tip of the cone is located at distances from the object shorter than the optical wavelength, on the order of 600 nm. Thus, this device, although it is very accurate in this application both in axial resolution and in lateral resolution, is very difficult to use since it must be feedback-controlled at a distance extremely close to the surface to be analyzed, which results in tip breakages and in the need to periodically change the optical fiber.

This same paper also discusses the use of the device in far field, that is, at distances from the object than may reach a few micrometers. However, in this case, the end of the fiber is rounded as indicated with reference 22, which provides a device very similar to that described in relation with FIG. 2.

The use of a fiber with a conical end is also described in EP-A-0283256. This document shows a fiber end such as shown in FIG. 4. The end of core 31 of the optical fiber is exposed and ends in a cone 32 which is shown with an apex angle on the order of 90°. However, this device is not used for interferometric measurements. The document does not describe that light is returned by reflection on the end of the optical fiber, but only that light is reflected by the surface of the object to be analyzed. The reflected light is directed back towards the source laser and the disturbances caused to the laser by this reflected light are analyzed to provide an indication of the distance variation between the object and the tip of the fiber. It indicates that the distance between the object and the tip of the fiber may range between 5 and 10 μm, and given the type of measurement used, it should be clear that very low reflected lights, on the order of from $10^{-4}$ to $10^{-6}$ times the emitted light, are analyzed in this case.

Further, this document teaches a very complex method for moving the end of the fiber, which must be metalized and placed in a vibrating state.

SUMMARY

Thus, an object of an embodiment of the present invention is to provide a device which overcomes at least some of the disadvantages of prior devices, that is, in particular:
  which enables to use a relatively large distance between the tip of an optical fiber and the surface to be analyzed,
  which requires no height control of the fiber, and which is relatively simple and compatible as concerns the measurement system with conventional interferometric devices.

Thus, an embodiment of the present invention provides an optical device of interferometric analysis of the surface condition of an object, comprising a light source; an optical fiber capable of receiving the incident light wave to transmit it to the object; a detector capable of detecting a combination between a light wave reflected by the optical fiber and a light wave sent back by the object; and wherein the optical fiber has a cone-shaped free end with an apex angle ranging between 15 and 25 degrees, the tip of the cone having dimensions smaller than 50×50 nm, and the cone tip is arranged, in operation, at a distance from the surface of the object ranging between 5 and 50 μm.

According to an embodiment of the present invention, the light wave sent back by the surface of the object to be analyzed originates from a delimited area of the illuminated surface having an extension ranging between half the wavelength and the wavelength of the incident wave.

According to an embodiment of the present invention, the device belongs to an object characterization system.

BRIEF DESCRIPTION OF THE DRAWINGS

The foregoing and other objects, features, and advantages of the present invention will be discussed in detail in the following non-limiting description of specific embodiments in connection with the accompanying drawings.

For clarity, the same elements have been designated with the same reference numerals in the different drawings and, further, as usual in the representation of micro-optical devices, the various drawings are not to scale.

DETAILED DESCRIPTION

Figure 1:
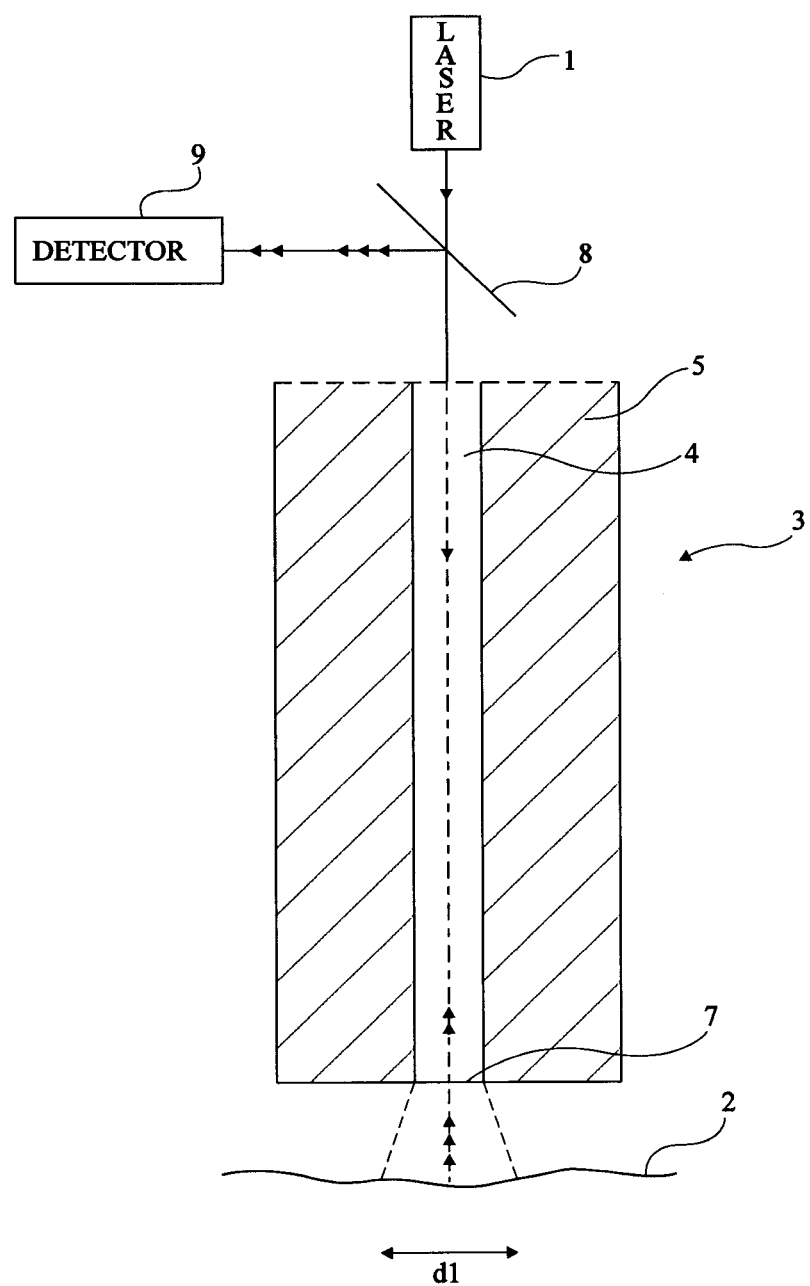
FIG. 1, previously described, schematically shows an optical device of interferometric analysis of the topography of a surface to be analyzed.
Figure 2:
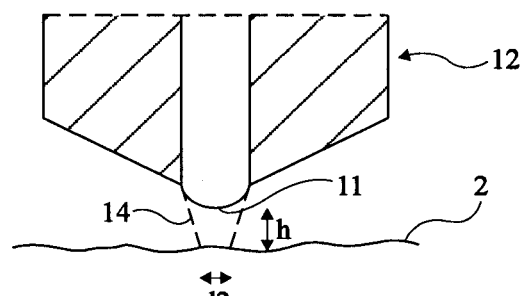
FIGS. 2, 3, and 4, previously described, show various optical fiber end structures.
Figure 3:
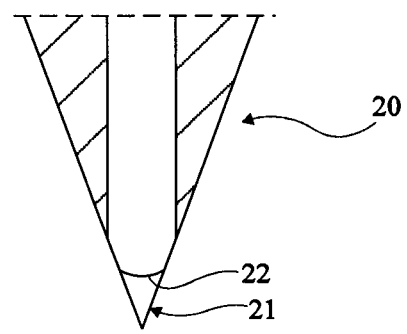
Figure 4:
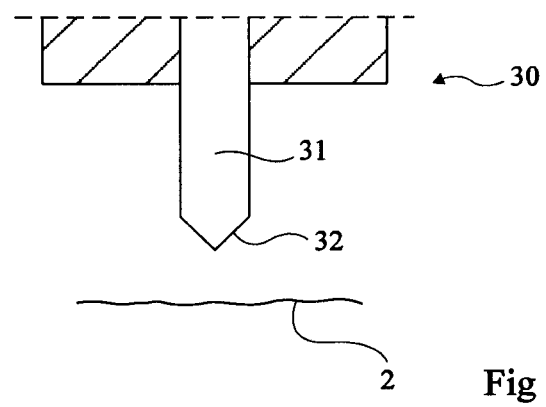
Figure 5:
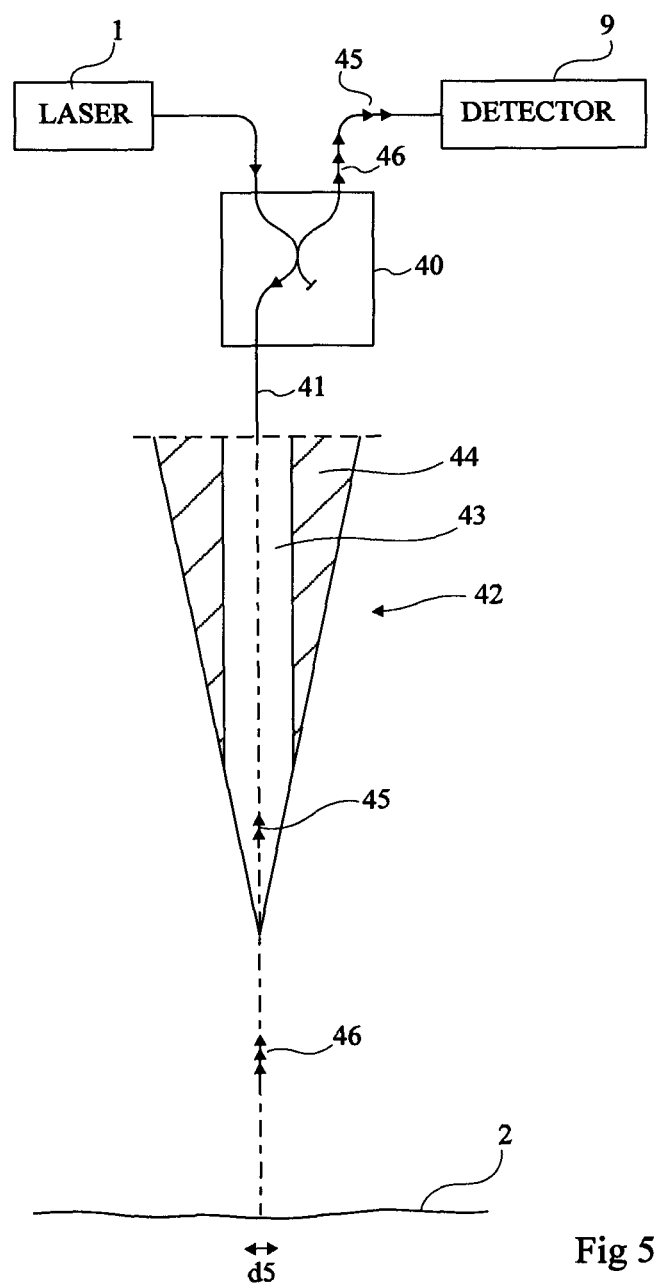
FIG. 5 shows an optical device of interferometric analysis of the surface condition of an object to be analyzed, according to an embodiment of the present invention.

FIG. 5 schematically shows an optical device of interferometric analysis of the surface condition of a material. In this device, a light source 1, for example, a laser, emitting in the visible range, sends via a directional optical coupler 40 a light beam 41 into an optical fiber 42, only the end thereof being shown. This optical fiber comprises a core 43 and an optical cladding 44, for example, made of silicon oxides of different dopings. The optical fiber is cone-shaped, the apex angle of the cone ranging from 15 to 25° and the optical fiber being extremely pointed, that is, with a rounded portion at the top of the cone having at most a radial extension on the order of 50 nm.

A first beam 45 is reflected by the tip of the fiber. The most part of the beam is sent by the fiber towards the surface of object 2 to be analyzed and a second beam 46 is reflected by the object. In directional coupler 40, return beams 45 and 46 are sent back to a detector 9. This detector may be a simple light detector enabling to observe the interferometric signal between beams 45 and 46. This detector is coupled to an analyzer (not shown) to analyze the interference state variations when the tip of the optical fiber moves laterally with respect to the object. The detector and the analyzer will not be described in detail since they have conventional features. A silicon photodiode, a current/voltage amplification device, and an analog-to-digital converter enabling to record and process interferometric measurements on a computer may for example be used for a detection in the range of visible wavelengths.

According to an important feature, the fiber is not clad. Thus, a relatively diverging beam comes out of the pointed end of the fiber. However, the inventors have observed that portion 46 of the beam reflected by the object and entering back into the fiber corresponds to a small useful part of the light spot sent by the fiber onto the object. Actually, the inventors have observed that, for a light beam emitted at a 600-nm wavelength, diameter d5 of this useful part is on the order of half the wavelength, that is, approximately 300 nm.

Further, an excellent fringe contrast can be observed, that is, the light reflected by the object most often substantially has the same intensity as the light reflected by the fiber even if the object has a low reflectivity, which is generally the case for biological objects immersed in a liquid medium. Such satisfactory features are maintained when the distance between the tip and the object varies within an extended wavelength range, from approximately 5 to approximately 50 μm. An average distance between the tip and the object greater than 10 μm may for example be selected, and a scanning may be performed without risking for the tip to run into the object.

Thus, with a fiber ending in a microtip such as described previously, far-field optical interferometric distance measurements may be performed for relatively large distances (from 5 to 50 μm) between the fiber tip and the object. This goes against common prejudice since, in prior art, all devices in which the fiber is provided with an end tip are either complex devices, or are used in near field or in far field but with short tip-to-surface distances. In the only case of use of a fiber having a tip with a small apex angle on the order of 20 degrees, such as described in Bergosi and Spajer's above-mentioned paper, the possibility of using a microtip in far field is discarded. On the contrary, when the authors want to operate in far field, they round off the end of the microtip to form a lens having a focus length on the order of a few micrometers.

The satisfactory features of the present invention seem to be due to the very specific features of the tip, that is, an unclad tapered tip having an end which is not rounded, except within the inevitable error margin, with a rounding extending over a surface with a diameter no greater than 50 nm as seen from the end.

The possibility of using a fiber at great distance from the surface of an object to be analyzed has, as indicated previously, many advantages, especially that of avoiding risks of collision between the tip and the object and thus of avoiding to have to regularly replace the fiber with a conical end, and to avoid the need for a feedback control, which greatly complicates the measurement device.

The invention claimed is:

1. Use of an optical device for interferometric analysis of the surface condition of an object, the optical device comprising:
    a light source;
    an optical fiber capable of receiving the incident light wave to transmit it to the object, the optical fiber having a cone-shaped free end with an apex angle ranging between 15 and 25degrees, the tip of the cone-shaped free end having a diameter smaller than 50 nm; and
    a detector capable of detecting a combination between a light wave reflected by the optical fiber and a light wave sent back by the object;
    wherein said use comprises:
    arranging the optical device with respect to the object so that, in operation, the cone-shaped free end is at a distance from the surface of the object ranging between 5 and 50 μm.

2. The use of the optical device of claim 1, wherein the light wave sent back by the surface of the object to be analyzed originates from a delimited area of the illuminated surface having an extension ranging between half the wavelength and the wavelength of the incident wave.

3. The use of the optical device of claim 1, wherein the optical device is a component in an object characterization system.

* * * * *